United States Patent [19]

Lipinski et al.

[11] Patent Number: 4,715,241

[45] Date of Patent: Dec. 29, 1987

[54] MECHANICAL LINEAR DRIVE SYSTEM

[75] Inventors: Reinhard Lipinski, Plochingen; Siegmund H. Kaiser, Nürtingen, both of Fed. Rep. of Germany

[73] Assignee: PROMA Produkt-und Marketing Gesellschaft mbH, Plochingen, Fed. Rep. of Germany

[21] Appl. No.: 834,896

[22] Filed: Feb. 28, 1986

[30] Foreign Application Priority Data

Mar. 2, 1985 [DE] Fed. Rep. of Germany ....... 3507497

[51] Int. Cl.$^4$ .................................................. F16H 29/02
[52] U.S. Cl. ................................. 74/89.15; 74/424.8 R
[58] Field of Search ....................... 74/89.15, 566, 441, 74/424.8

[56] References Cited

U.S. PATENT DOCUMENTS

| | | | |
|---|---|---|---|
| 3,320,698 | 5/1967 | Hummel | 74/89.15 |
| 3,449,971 | 6/1969 | Posh | 74/89.15 |
| 3,483,765 | 12/1969 | Fornataro | 74/89.15 |
| 3,528,303 | 9/1970 | Haller | 74/89.15 |
| 3,670,583 | 6/1972 | Leming | 74/441 |
| 4,512,208 | 6/1985 | Lipinski et al. | 74/89.15 |
| 4,557,156 | 12/1985 | Teramachi | 74/89.15 |

FOREIGN PATENT DOCUMENTS

| | | |
|---|---|---|
| G8132113 | 1/1984 | Fed. Rep. of Germany . |
| 3205143 | 4/1984 | Fed. Rep. of Germany . |
| 2465930 | 4/1981 | France ............... 74/89.15 |

*Primary Examiner*—Peter A. Aschenbrenner
*Assistant Examiner*—Gerald A. Anderson
*Attorney, Agent, or Firm*—Frishauf, Holtz, Goodman & Woodward

[57] ABSTRACT

A mechanical linear drive system for generating a defined linear movement of a driven force transfer element (16) has a spindle drive, the threaded spindle (7) of which is supported in a profiled tubular structure (1) of stable shape, closed off at the end by bearing flanges (9) and provided with a linear slit through which the force transfer element, drivingly coupled in the longitudinal direction of the tubular structure by the spindle nut (11) of the spindle drive, protrudes to the outside out of the tubular structure. To permit adaptation to conditions imposed by various kinds of use, the arrangement is such that the spindle nut is supported rotatably and axially immovably on the force transfer element, and that a drive means that is joined with the force transfer element is coupled with the spindle nut (11) via a gearing means (18, 19, 20) located on the force transfer element (16). This drive means, and a further drive means (10) that may be provided for driving the threaded spindle, makes it possible to generate the most varied kinds of linear movements. A plurality of spindle nuts can also be provided on the threaded spindle, or the threaded spindle can be divided into a plurality of spindle portions.

14 Claims, 4 Drawing Figures

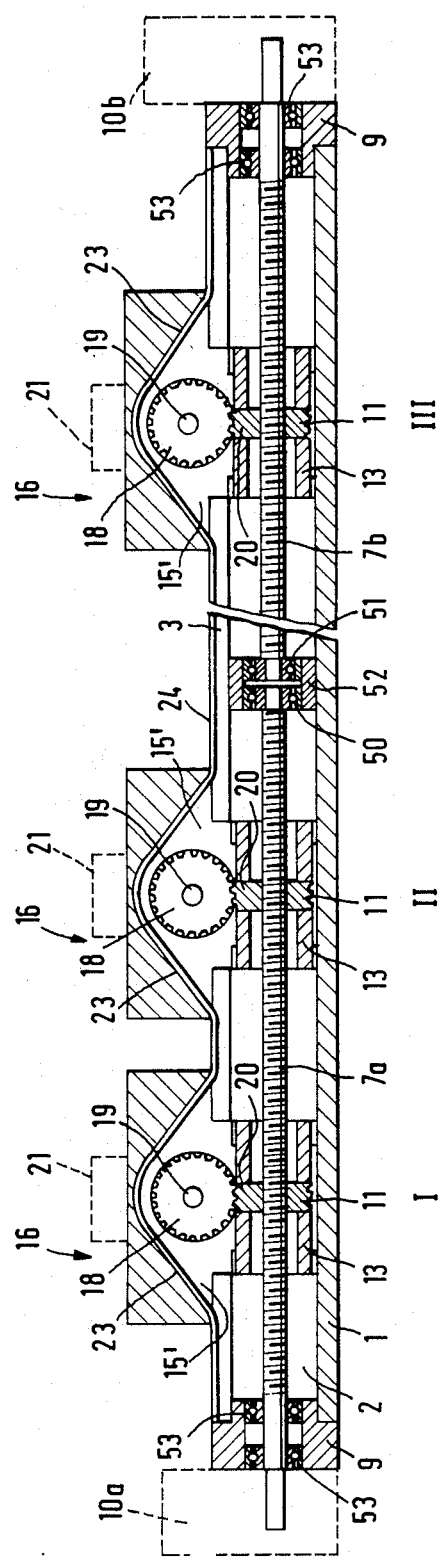
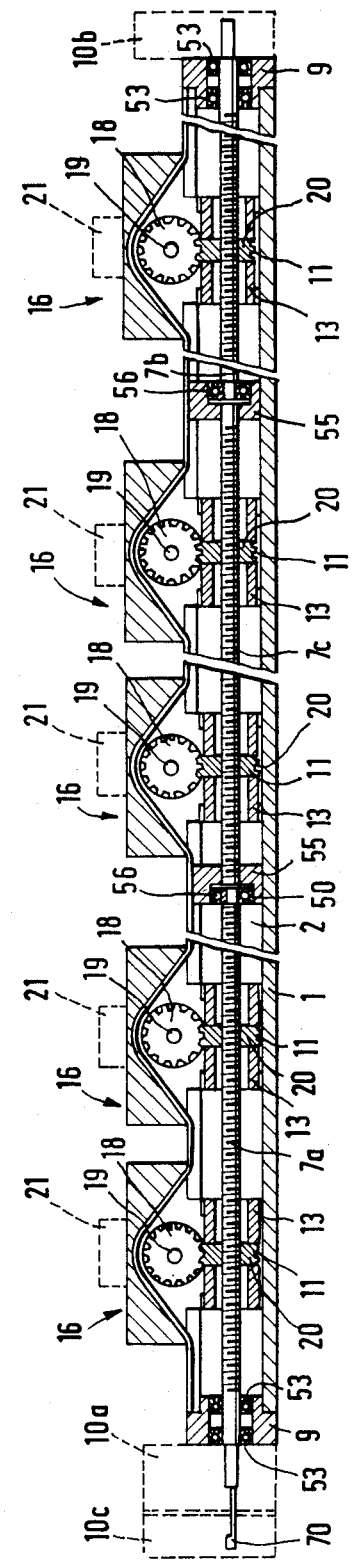

MECHANICAL LINEAR DRIVE SYSTEM

Reference to related patent, the disclosure of which is hereby incorporated by reference, assigned to the assignee of the present application: U.S. Pat. No. 4,512,208, LIPINSKI & NEFF to which German Patent No. 32 05 143 corresponds.

The present invention relates to a mechanical linear drive system for generating a defined linear movement of a driven force transfer element on a spindle drive.

BACKGROUND

A mechanical linear drive system having these characteristics is known from U.S. Pat. No. 4,512,208 (=German Patent No. 32 05 143). In this linear system, the threaded spindle is rotatably supported in the bearing means of the profiled tubular structure and can be coupled to an electric motor mounted externally on one of the bearing means. This linear system is distinguished by the fact that, among other advantages, the force transfer element can be positioned exactly, and large drive forces can be transferred. Since the linear movement of the force transfer element is automatically generated by the drive threaded spindle, however, it is fundamentally impossible to move a plurality of force transfer elements on one axis independently of one another. Furthermore, a variation in the speed of the linear movement of a force transfer element can be done only by varying the rotational speed of the threaded spindle accordingly.

However, there are applications in which it would be desirable to have a greater range of freedom in terms of the possible drive options for linear movements to be generated.

This is also applicable to a positioning drive means disclosed in German Utility Model DE-GM No. 81 32 113, which has a positioning spindle provided with an external thread and secured against rotation; this spindle is screwed into a nut element coupled to a motor via a slip coupling and a gear. The nut element is supported in a gear box such that it is axially immovable; by its rotation it axially displaces the positioning spindle. A further factor in this positioning drive means is that the axial adjustment of the positioning spindle precludes its accommodation in a profiled tube that would surround it over its entire length and thereby protect it from external influences. It is in no manner possible to derive the adjusting movement from more than a single drive means.

THE INVENTION

It is an object to provide a mechanical linear drive system which has enhanced possibilities of utility as compared with the linear system of the prior art, yet which does not as a result require substantially more space and in which the precision of positioning the driven parts, or of their movements, is not impaired.

Briefly, a spindle nut is threaded on a spindle which may be rotatable, or may be locked in a predetermined position. A force transfer element is located in an elongated slit formed in a tubular structure surrounding the spindle; the spindle nut and the force transfer element, which extends through the slit, are so coupled together that the spindle nut can rotate with respect to the force transfer element, while inhibiting, however, relative axial movement between the spindle nut and the force transfer element. A gearing is provided, coupled for rotation of the spindle nut and driven independently by an external motor, such as an electric motor.

The arrangement permits rotation of the spindle nut independently of any rotation of the spindle and thus permits positioning of the force transfer elements independently of rotation of the spindle. A plurality of force transfer elements may, therefore, be located on the spindle, to be moved simultaneously upon rotation of the spindle or, independently, upon energization of the respective motors on the respective force transfer elements, or in any combinations.

In accordance with a feature of the invention, particularly simple structural relationships are attained if the spindle nut has an external gearing means or is joined for coupled rotation with a coaxial drive element that has an external gearing means, and at least one gear wheel is rotatably supported in the force transfer element and coupled with the drive means, the gear wheel extending through the linear slit of the tubular structure and meshing with the external gearing means.

DRAWINGS

FIG. 3 shows a mechanical linear drive system according to the invention in a modified embodiment, seen in axial section in a side view, shown schematically; and FIG. 4 is a schematic view corresponding to FIG. 3, of a mechanical linear drive system according to this invention in a further modified embodiment.

DETAILED DESCRIPTION

Figure 1:
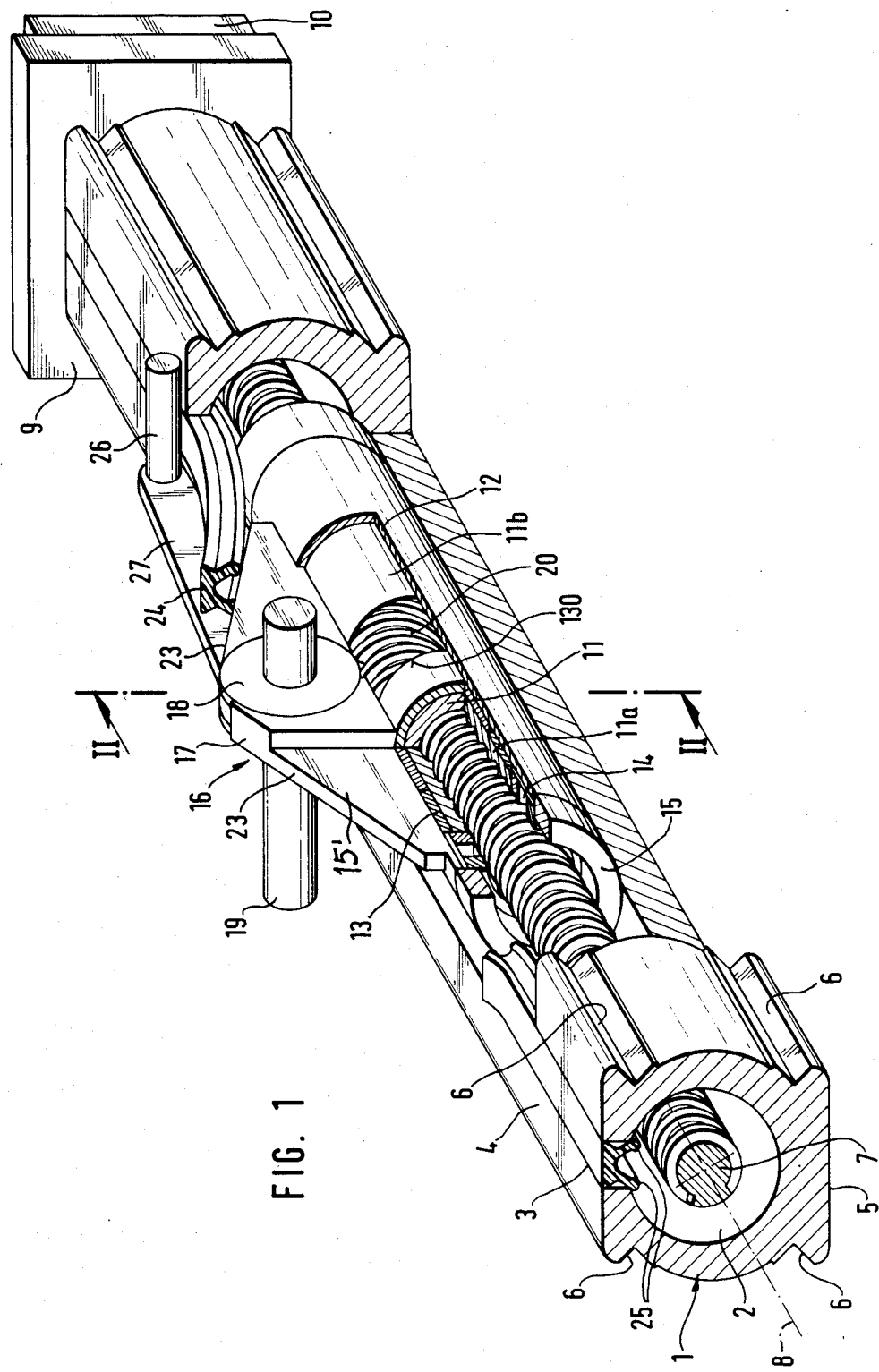
FIG. 1 is a perspective view, partially cut away, of a detail of a mechanical linear drive system according to the invention.

The mechanical linear drive system has a profiled tubular structure 1, for instance of extruded aluminum, which includes a cylindrical longitudinal bore 2 and on one side has an axially parallel linear slit 3 extending into the longitudinal bore 2. The linear slit 3 is defined by parallel flanks and terminates on the outside of the tubular structure at a flat face 4, with which a correspondingly parallel face 5 on the opposite side of the tubular structure is associated. On the exterior wall of the tubular structure 1, four prismatic longitudinal guideways 6, having an approximately rectangular cross section, are distributed uniformly, extending the length of the tubular structure.

A threaded spindle 7 is located in the bore 2, concentric with its axis 8, and is supported at both ends in two bearing means, one of which is shown at 9; the two bearing means are mounted on the opposite end faces of the tubular structure 1 and retain it in axially fixed position.

The threaded spindle 7 may be retained in the bearing means 9 such that it is restrained from rotation. However, it may also be arranged such that the threaded spindle 7 is rotatably supported in the bearing means 9 and is coupled at one end to an electric motor 10 mounted on one of the bearing means 9 and serving as a separate drive means for the threaded spindle 7.

A two-piece spindle nut 11 is mounted on the threaded spindle 7, its two portion 11a, 11b being located on either side of a bush-like intermediate element 12 serving as a drive element for the spindle nut 11. The two threaded nut portions 11a, 11b are joined for coupled rotation with the intermediate element 12, which is supported in a tubular housing portion 13 such that together with the spindle nut 11 it is rotatable but is axially immovable with respect to the portion 13. To this end, both portions 11a, 11b of the spindle nut are supported by the abutment of radial and axial bearings against the tubular housing 13; one of the axial bearings is shown at 14. The axial bearing is axially retained by means of an abutment ring 15 and an identical second abutment ring located on the other end of the tubular housing 13 and not visible in FIG. 1. The abutment rings 15 impart a mutual axial bias to the two spindle nut portions 11a, 11b and press them against the intermediate element 12. In this manner, the spindle drive formed by the threaded spindle 7 and the spindle nut 11 becomes free of play.

The tubular housing portion 13 is guided such that it is longitudinally displaceable in the bore 2 of the tubular structure 1; on the outside of its wall, it has a strut-like coupling element 15′, which protrudes through the linear slit 3 and is laterally guided therein. The strut-like coupling element 15 and the housing 13 surrounding the threaded spindle 7 together form a force transfer element 16, which is provided with means not shown, such as bores and the like, for attaching it to a machine part and the like which it is intended to move.

A helical spur gear 18 is rotatably supported a bearing portion 17 of the coupling element 15′ of, the force transfer element 16. The helical spur gear 18 is mounted on a drive shaft 19 with which it is coupled for rotation; the gearing of the spur gear meshes with an external gearing means 20, likewise a helical gearing means, on the intermediate element 12. The angular gear formed in this manner permits the conversion of a rotational movement of the drive shaft 19 into a corresponding linear movement of the force transfer element 16 along the linear slit 3.

Figure 2:
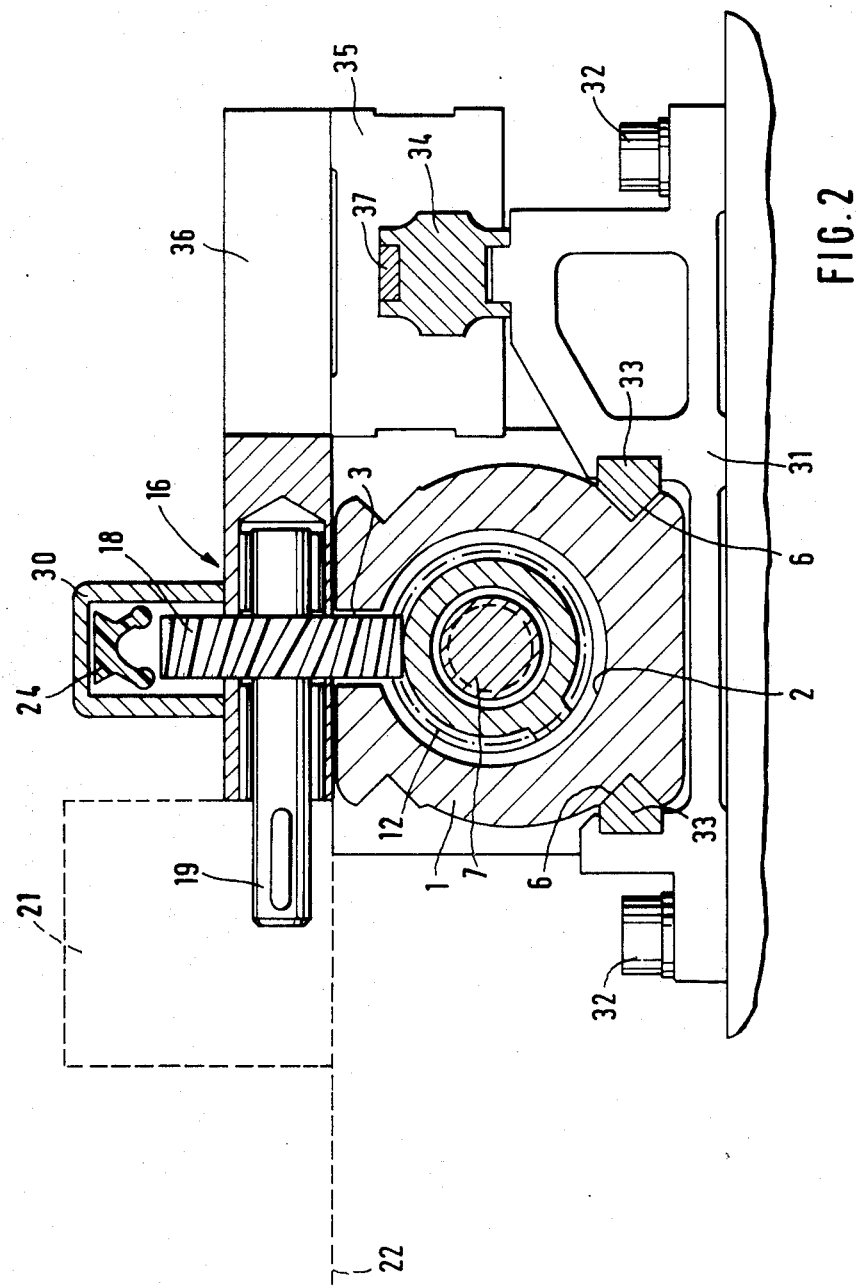
FIG. 2 is a side view of the linear drive system of FIG. 1 in a section taken along the line II—II of FIG. 1.

In order to generate this linear movement, a drive means is coupled with the force transfer element 16, being in the form of an electric motor shown in dashed lines at 21 in FIG. 2, which is coupled with the drive shaft 19 and has a flexible electrical supply cord 22. The electric motor 21 may be of any arbitrary type. It may be a stepping motor, and naturally it is also possible to provide a pneumatic or hydraulic drive means in its stead.

The strut-like coupling element 15′ is provided on both ends of the drive shaft 19 with two inclined faces 23 of wedgelike shape, which serve to guide an elastic cover strip 24 for the linear slit 3. The flexible cover strip 24 is anchored at its ends in the two bearing means 9. It has two protrusions 25 along its length, which can be pressed together from the sides and with which it grips the edges of the slit 3 from underneath and is elastically pressed against the walls of the linear slit 3.

As may be seen in FIG. 1, the linear slit 3 is closed off, on either side of the force transfer element 16, by the cover strip 24 that is fitted into the slit 3 and retained there both form-fittingly and by friction. Upon a movement of the force transfer element 16, for instance to the left (as seen in FIG. 1), the cover strip 24 on the left-hand side is continuously lifted up out of the linear slit 3 by the associated guide face 23, while on the right-hand side the cover strip 24 extending away from the other guide face 23 is continuously pressed into the linear slit 3 by a pressure roller 26 connected to the force transfer element 16. The pressure roller 26 is joined to the force transfer element 16 via two connecting plates 27, only one of which is shown in FIG. 1. A similarly embodied and supported pressure roller is also provided on the other side of the force transfer element 16 but is not shown in FIG. 1 so as to provide a clearer view.

The force transfer element may also be covered on the outside by a hood, such as that shown in FIG. 2 at 30. The tubular structure 1 is mounted on a frame 31, which is screwed firmly by means of securing screws 32 to a base and has clamping means 33 of a prismatic cross section, which engage the longitudinal guideways 6 of the tubular structure 1 and are clamped to this structure. A guide rail 34, which forms a guide track means for a slider element 35, is secured to the frame 31, which may be in several parts. The guide track means 34 extends parallel to the axis of the tubular structure. The slider element is substantially C-shaped in cross section and is guided in a longitudinally displaceable manner on the guide track means 34 by means of linear bearings, not shown in detail. The slider element 35 is rigidly connected to the force transfer element 16 via a connecting element 36. The slider element may for example cooperate with a measuring bar 37 set into the guide track means 34, forming with this bar a highly precise measuring system.

Alternatively, some other machine element, to which a longitudinal movement is imparted by the linear drive system described, may be coupled to the slider element 35 or to the force transfer element 16. This longitudinal movement may, as already explained, be generated by the drive motor 21 via the drive shaft 19 and/or via the drive motor 10 and the threaded spindle 7.

In accordance with a feature of the invention it is possible to mount a plurality of force transfer elements like that shown at 16 in FIGS. 1, 2 on the threaded spingle 7, all having an identical structure and each having its own drive motor 21. These various drive motors 21 associated individually with the various force transfer elements make it possible to impart a linear movement to the force transfer elements 16 and the machine elements coupled to them independently of one another, and a shared linear movement, optionally provided by the drive of the threaded spindle 7, can be superimposed on these mutually independent linear movements.

In the exemplary embodiment shown, both portions 11a, 11b of the spindle nut 11 are joined for coupled rotation with the intermediate bush-like element 12 located between them, which has the external gearing 20. Gearing 20 is exposed by a recess 130 in the wall of the tubular housing portion 13, in the zone of engagement with the gear wheel 18. Alternatively, it would also be possible for the external gearing 20 to be provided directly on the spindle nut 11; this is mentioned for the sake of completeness.

In FIGS. 3 and 4, two modified embodiments of the linear drive system are shown schematically. These embodiments are distinguished by affording additional opportunities for varying the linear movements that are to be obtained with such a linear drive system.

The threaded spindle 7, which in the embodiment of FIGS. 1, 2 is in one piece, is divided into a plurality of coaxial spindle portions 7a, 7b, each of which is supported at one end, that is, at their ends oriented toward one another and located in the tubular structure 1, in a rotatable manner in the tubular structure 1 via separate roller bearings 50, 51 and one cylindrical bearing bush 52 introduced in a rotationally fixed manner (see FIG. 3) into the longitudinal bore 2 of the tubular structure 1.

The bearing location associated with the other end of each of the spindle portions 7a, 7b is provided in the associated bearing means 9 and is formed by a roller bearing 53 introduced into a corresponding bearing bore of the bearing means 9. Two electric motors 10a, 10b, serving as separately controllable drive means for the two spindle portions 7a, 7b, are mounted on the bearing means 9. Alternatively, however, the arrangement could also be such that at least one of the spindle portions 7a, 7b is nonrotatably supported in its associated bearing means 9.

Each of the two spindle portions 7a, 7b has at least one spindle nut 11, which is rotatably supported in a recess, correspondingly defined by parallel flanks, of its associated tubular housing portion 13. Nut 11 is axially fixed in housing portion 13. Each tubular housing portion 13 again has a strut-like coupling element 15' on its outside, which protrudes to the outside through the linear slit 3 and forms a portion of one force transfer element 16, which can be coupled with some other device, not shown, that is to be driven, such as some part of the machine that it is intended to move.

An electric motor 21 forming a separate drive means is joined to each of the force transfer elements 16 and drives the drive shaft 19, which in turn is joined in a rotationally coupled manner to the helical spur gear 18 of the angular gear already described. The spur gear 18, with its gearing, meshes with an external gearing 20 of the corresponding spindle nut 11.

The cover strip 24 covering the linear slit 3 between the force transfer elements 16 is again, as shown in FIGS. 1 and 2, guided via inclined guide faces 23 of the force transfer element 16.

The number of spindle nuts 11 provided on one spindle portion 7a, 7b, each being coupled with its own drive means 21, depends on the intended use in a given instance; the arrangement shown in FIG. 3 is not intended to restrict this in any way. It is also possible for some of the spindle nuts 11 to be individually joined in a rotationally coupled manner to their tubular housing portion 13, rather than with a drive means 21 located on the associated force transfer element 16, such that the linear movement of such a force transfer element is generated solely by the rotational movement of the associated spindle portion 7a or 7b.

By appropriate selection of the rotational speed and rotational directions of the drive means 10a, 10b of the two spindle portions 7a, 7b and of the drive means 21 of the individual force transfer elements 16, any desired relative movement, both with respect to one another and with respect to the tubular structure 1, can be imparted to the force transfer elements 16. The linear movement of individual force transfer elements 16 can also be synchronized with each other, and on the other hand it is also possible in particular to move force transfer elements 16 toward or away from one another.

The advantage of a linear drive system embodied and driven as described above is furthermore that all the various force transfer elements 16, having different linear speeds to suit given purposes and being individually adjustable, are guided and supported in the same continuous tubular structure 1, so that it is no longer necessary to provide a plurality of linear drive system units in succession, as is otherwise required for such applications. The force transfer elements 16 can also be moved inside this one profiled structure 1 into positions in which all of them, or individual ones of them, rest with their end faces directly adjacent one another. Such a provision is not readily attainable in drive systems comprising a plurality of separate linear drive system units arranged in succession, because the bearing means 9 and the drive means mounted on them would dictate a certain minimum spacing between adjacent tubular structures.

The embodiment of a linear drive system shown in FIG. 4 substantially corresponds to the above-described linear drive system shown in FIG. 3, so that elements common to both these embodiments need not be described again.

Deviating from the embodiment of FIG. 3, however, the threaded spindle in the embodiment of FIG. 4 is divided into three spindle portions 7a, 7b and 7c, of which the two spindle portions 7a, 7b are, as in FIG. 3, rotatably supported in the bearing means 9 via the roller bearings 53 and are coupled to the electric motors 10a, 10b mounted on the bearing means 9 and each forming a separate drive means. Naturally, however, one of the spindle portions 7a or 7b could be retained nonrotatably in the associated bearing means, in which case the corresponding drive motor 10a or 10b is omitted. The third spindle portion 7c is nonrotatably supported, between the two spindle portions 7a, 7b protruding from the ends of the tubular structure 1, in the bore 2 of the tubular structure 1 in cylindrical bearing bushes 55, which are in turn nonrotatably joined to the tubular structure 1. Each of the bearing bushes 55 has a coaxial bearing recess 56, into which the respective roller bearing 50 or 51 that rotatably supports the corresponding spindle portion 7a or 7b at one end is introduced.

Once again, in the manner described above, force transfer elements 16 which are longitudinally guided on the tubular structure 1 are mounted with their spindle nuts 11 on the three spindle portions 7a, 7b and 7c. Each of the force transfer elements 16 is assigned its own drive means 21 disposed upon it, which makes it possible to move the force transfer element 16 by a corresponding drive of its spindle nut 11 along the tubular structure 1.

The force transfer elements 16 coupled with the two outermost spindle portions 7a, 7b may be moved by either the drive means 10a or 10b or by their associated drive means 21, while the movement of the force transfer elements 16 coupled with the spindle portion 7c is effected solely via their drive means 21.

By appropriately designing and controlling the individual drive means 10a, 10b and 21, virtually any conceivable mutually independent linear movements of the force transfer elements 16 can be attained; these elements can be moved toward or away from one another, or in synchronism with one another.

The number of spindle portions into which the threaded spindle 7 of the embodiment shown in FIGS. 1, 2 can be divided is theoretically unlimited; the only restriction is that presented by practical structural considerations. It is also readily possible for the middle spindle portion 7c of the embodiment of FIG. 4, for instance, also to be driven via its own additional drive means, for instance by forming one of the abutting spindle portions 7a, 7b as a hollow spindle and having it surround a coaxial drive spindle, which protrudes out of the tubular structure 1 at one end and on the other end is joined in a rotationally coupled manner to the spindle portion 7c. This drive spindle is shown at 70 in FIG. 4. Its drive motor 10c, which is flanged to the drive motor 10a, is shown in dashed lines.

In a preferred embodiment, the structural arrangement may be such that the force transfer element 16 has a portion that at least partially surrounds and grips the threaded spindle 7, this portion being coupled on both sides in the axial direction with the spindle nut 11 and formed as a tubular housing portion 13 that is axially guided in the bore 2 of the tubular structure 1. This tubular housing portion 13 provides very accurate guidance of the force transfer element 16 in the bore 2 of the tubular structure 1, and it simultaneously permits simpler manufacture.

Since the drive means, which as a rule is an electric motor, is joined to the force transfer element 16 and moved with it, the threaded spindle can be nonrotatably supported in the bearing means 9, embodied as bearing flanges. In principle, however, it is also possible for the threaded spindle, rotatably supported in the bearing means, to be coupled with its own drive means 10, 10a. This provision makes it possible to determine the linear speed of the force transfer element either selectively, by means of the first drive means that is moved along with the force transfer element, or by means of the second drive means that drives the threaded spindle, or yet again to derive the linear speed from the sum of, or difference between, the rotational speeds of the two drive means mentioned. Thus the linear speed of the force transfer element can be varied between a value of zero and a value twice what could be maximally attained using only one of these two drive means.

At least two force transfer elements 16 can be located on the threaded spindle, each of them having a threaded nut 11 and each joined to its own drive means 21. These drive means permit moving each of the force transfer elements linearly on the common axis of movement independently of the other force transfer elements; by this provision, not only can the distances by which adjacent force transfer elements are spaced apart be selectively varied, but the force transfer elements can also be driven at different speeds. Except for their order in succession, the force transfer elements are entirely independent of one another, and the threaded spindle may either be arranged for coupled rotation or, as mentioned, coupled with its own drive means.

The possibilities of utility of the linear drive system can be still further enhanced by dividing the threaded spindle into at least two coaxial spindle portions, see FIGS. 3 and 4, supported at one end in the tubular structure 1 and each of which has at least one spindle nut of its own and one force transfer element 10a, 10b; at least one of the spindle nuts 11 is then joined to a gearing means 18 located on its force transfer element 16. The two spindle portions 7a, 7b may be driven each by its own drive means 10a, 10b mounted on the associated bearing flange; however, regardless of the intended use, it is also possible for instance to drive only one of the spindle portions, while the other is nonrotatably retained in the tubular structure. The spindle nuts 11 located on the spindle portions, likewise, may either all be coupled via a gearing means in the manner described, each with its own additional drive means 21, or else only individual ones of the spindle nuts may be so formed. By appropriately selecting and coordinating the drive means for the spindle portions 7a, 7b and the spindle nuts 11, it is possible with the linear drive system not only to impart different linear movements to the force transfer elements 16 joined to the spindle nuts, but also to move individual force transfer elements toward or away from one another, that is, to vary the distance by which they are spaced apart. There are many applications in which such great variety of possible movements is important.

The linear drive system may be used as a structural unit or module for generating one or more linear movements in machines, forward-feed units, transfer devices and the like. The system enables large loads to be moved linearly at high speed. Because of the high accurate positioning and the precise constrained dependence between the rotational angle of the drive means and the associated position of the force transfer element that are attainable, this system can also be used for highly precise measuring, positioning and indicator instruments, in which an important consideration is for instance that an electrical signal be converted into a certain travel distance or position. Depending on the kind of drive means used—whether direct current motors, stepping motors, etc.—analog and other electrical signals can be used for controlling the linear drive system.

An externally located longitudinal guideway 34, FIG. 1 is preferably provided on the profiled tubular structure, on which a slider element 35 that is coupled with the force transfer element 16 is movable. The tubular structure can also be clamped firmly to a frame by means of lateral clamping means 32, which in turn support the longitudinal guideway. This frame may instead, however, or in addition, be provided with its own guide track means, which extends parallel to the tubular structure.

To prevent the escape of lubricant from the tubular structure and to assure at least dustproof encapsulation of the spindle drive, it is advantageous for the linear slit 3 of the tubular structure to be provided on both sides of each force transfer element with a flexible cover strip 24 anchored on its ends in the bearing flanges and retained in a releasable manner in the linear slit by friction and/or form-fitting engagement.

We claim:
1. Mechanical linear drive system comprising
   a threaded spindle (7) having at least two coaxial spindle portions (7a, 7b, 7c) each of which define end portions;
   spaced bearing means (9) mounting the end portions, at least one of the space bearing means being a rotatable bearing, at least one spindle portion (7a, 7b) is free to rotate in the bearing means to form a rotatable spindle portion;
   at least one spindle motor drive (10a, 10b, 10c) coupled to the at least one rotatable spindle portion;
   a tubular structure (1) having two ends, and formed with an axial linear slit (3), said tubular structure circumferentially surrounding the spindle (7), with clearance, the spaced bearing means being secured to the tubular structure ends
   means retaining the spaced bearing means in axially fixed position,
   said spaced bearing means closing off the ends of the tubular structure;
   at least one internally and externally threaded spindle nut (11) located on and coupled to each of said threaded spindle portions (71, 7b) by the internal threading of said nut;
   a force transfer element (16) associated with and coupled to each one of said spindle nuts (11), the force transfer element (16) extending outwardly of the tubular structure through said slit (3);
   an individual drive means (21) associated with each force transfer element (16);

a gearing mean (18, 20) on each force transfer element drivingly coupling the respective individual spindle motor drive means (21) to the external threading of said spindle nut (11), and having means to couple each spindle nut (11) and the associated force transfer element (16) together in a manner permitting rotation of the spindle nut with respect to the associated force transfer element while inhibiting relative axial movement between the respective spindle nut (11) and the associated force transfer element (16).

2. System according to claim 1 including at least one intermediate bearing element (55) located intermediate to said spaced bearing means, said intermediate bearing element retaining one said end portion of one said spindle portion (7a, 7b).

3. System according to claim 1 wherein one of said spindle portions comprises a hollow spindle (7a);

a central spindle (7c) within the hollow spindle (7a) and extending through the hollow spindle;

and separate drive means (10a, 10c) coupled to said hollow spindle (7a) and, respectively, said central spindle (7c).

4. System according to claim 3 wherein the gearing means comprises a gear (18) rotatably positioned on the force transfer element (16); and coupled to the external threading (20) on the spindle nuts.

5. System according to claim 1 wherein the gearing means comprises a gear (18) rotatably positioned on the force transfer element (16) and in engagement with the external threading (20) formed on the spindle nuts.

6. System according to claim 5 wherein the spindle nuts comprise a composite element (11, 12) including a nut body (11) and an element (12) nonrotatably securd to the nut body and carrying the external threading (20).

7. System according to claim 1 wherein the force transfer element (16) includes a portion (13) surrounding, at least in part, the spindle (7), said portion being coupled with the spindle nuts (11), said portion forming an essentially tubular element which is longitudinally axially guided within the said tubular structure (1).

8. System according to claim 1, wherein both spaced bearing means are rotatable bearings, the spindle portions (7a, 7b) being rotatably located in said bearing means;

and a spindle motor drive (10a, 10b) is provided for each spindle portion.

9. System according to claim 1 further including a guide track means (34) coupled to the tubular structure (1);

and a slider element (35) slidably movable on said guide track means and coupled to the force transfer element.

10. System according to claim 9 including a frame (31) and means (33) for clamping the tubular element on the frame, said guide track means (34) being supported on the frame.

11. System according to claim 10 wherein the guide track means includes a guide track shaped to guide the slider element (35) longitudinally of the guide track means.

12. System according to claim 9 wherein the guide track means includes a guide track shaped to guide the slider element (35) longitudinally of the guide track means.

13. System according to claim 1 further including a flexible cover strip (24) defining terminal ends, engageable in the linear slit (3) and selectively removable from that slit in the region of the force transfer element (16), said cover strip being retained in position in said slit and, at its said terminal ends, in said spaced bearing means.

14. System according to claim 1 wherein the individual drive means (21) are joined to the associated force transfer element (16).

* * * * *